US012309150B1

(12) United States Patent
Anand et al.

(10) Patent No.: US 12,309,150 B1
(45) Date of Patent: May 20, 2025

(54) SYSTEMS AND METHODS CONFIGURED FOR AUTOMATICALLY ASSIGNING A UNIQUE IDENTIFIER TO A DETECTED DEVICE

(71) Applicant: Virtualitics, Inc., Pasadena, CA (US)

(72) Inventors: Vaibhav Anand, Chicago, IL (US); Charles Joseph Bonfield, Raleigh, NC (US); Brandon Lee Knight, South Lake Tahoe, CA (US); Sarthak Sahu, Pasadena, CA (US); Ciro Donalek, Pasadena, CA (US); Michael Amori, Pasadena, CA (US)

(73) Assignee: Virtualitics, Inc., Pasadena, CA (US)

( * ) Notice: Subject to any disclaimer, the term of this patent is extended or adjusted under 35 U.S.C. 154(b) by 0 days.

(21) Appl. No.: 18/785,915

(22) Filed: Jul. 26, 2024

Related U.S. Application Data

(60) Provisional application No. 63/649,179, filed on May 17, 2024.

(51) Int. Cl.
*H04L 9/40* (2022.01)
(52) U.S. Cl.
CPC ............................... *H04L 63/0876* (2013.01)
(58) Field of Classification Search
CPC ................................................... H04L 63/0876
See application file for complete search history.

(56) References Cited

U.S. PATENT DOCUMENTS

| | | | |
|---|---|---|---|
| 8,332,947 B1 | 12/2012 | Bregman et al. | |
| 8,555,388 B1 | 10/2013 | Wang et al. | |
| 9,747,570 B1 | 8/2017 | Vescio | |
| 11,528,189 B1* | 12/2022 | Egri et al. | H04L 41/085 |
| 11,734,157 B2 | 8/2023 | Sahu et al. | |
| 12,026,137 B1* | 7/2024 | Sethi et al. | G06F 16/215 |
| 2006/0272011 A1 | 11/2006 | Ide et al. | |
| 2016/0352569 A1* | 12/2016 | Galliher, III et al. | H04L 41/0813 |
| 2017/0374094 A1 | 12/2017 | Agarmore et al. | |
| 2018/0124091 A1 | 5/2018 | Sweeney et al. | |

(Continued)

FOREIGN PATENT DOCUMENTS

| | | |
|---|---|---|
| CN | 106790190 A | 5/2017 |
| CN | 107347074 A | 11/2017 |

(Continued)

*Primary Examiner* — James J Debrow
(74) *Attorney, Agent, or Firm* — Greenberg Traurig, LLP

(57) ABSTRACT

In some embodiments, the present disclosure provides an exemplary method that may include steps of obtaining data associated with a device within a network; determining a digital fingerprint via identification data of the device based on a scan of the network and data associated with the device by: comparing the identification data of the device to a plurality of devices within the, generating a unique identification code that uniquely identifies the device based on a similarity score for the device, and determining the unique identification code for the device based on the digital fingerprint; and generating a network security map that represents a topology of the network, wherein the network security map maps the device within the topology according to the unique identification code so as to facilitate causing at least one security action with respect to the device within the network.

30 Claims, 8 Drawing Sheets

(56) References Cited

U.S. PATENT DOCUMENTS

| | | |
|---|---|---|
| 2018/0324219 A1 | 11/2018 | Xie et al. |
| 2018/0336353 A1 | 11/2018 | Manadhata et al. |
| 2018/0351987 A1 | 12/2018 | Patel et al. |
| 2019/0289029 A1 | 9/2019 | Chawla et al. |
| 2019/0296979 A1* | 9/2019 | Gupta et al. ............ H04L 41/12 |
| 2020/0167705 A1 | 5/2020 | Risoldi et al. |
| 2020/0311298 A1 | 10/2020 | Dunjic et al. |
| 2020/0412757 A1 | 12/2020 | Siddiq |
| 2021/0099475 A1 | 4/2021 | Eshghi et al. |
| 2021/0211450 A1 | 7/2021 | Aleidan |
| 2021/0211452 A1 | 7/2021 | Patel et al. |
| 2021/0218765 A1 | 7/2021 | Rodriguez Bravo et al. |
| 2021/0266340 A1 | 8/2021 | Grounds et al. |
| 2021/0344713 A1 | 11/2021 | Kras et al. |
| 2022/0046045 A1 | 2/2022 | Rao et al. |
| 2022/0046048 A1 | 2/2022 | Koo et al. |
| 2022/0060509 A1 | 2/2022 | Crabtree et al. |
| 2022/0191230 A1 | 6/2022 | Morgan |
| 2022/0263855 A1 | 8/2022 | Engelberg et al. |
| 2022/0353169 A1 | 11/2022 | Balinzo et al. |
| 2023/0004655 A1 | 1/2023 | Poulin et al. |
| 2023/0047450 A1 | 2/2023 | Koo et al. |
| 2023/0208870 A1 | 6/2023 | Yellapragada et al. |
| 2023/0208871 A1 | 6/2023 | Yellapragada et al. |
| 2023/0262093 A1 | 8/2023 | Gupta et al. |
| 2023/0300161 A1 | 9/2023 | Jenks et al. |
| 2023/0334361 A1 | 10/2023 | Yamanaka |
| 2023/0336579 A1 | 10/2023 | Ellsworth |
| 2023/0336581 A1 | 10/2023 | Dunn et al. |
| 2024/0007350 A1 | 1/2024 | Gupta et al. |
| 2024/0095150 A1 | 3/2024 | Sahu et al. |
| 2024/0187439 A1 | 6/2024 | Sand et al. |
| 2024/0333683 A1 | 10/2024 | Sestan et al. |
| 2024/0338455 A1 | 10/2024 | Madison, Jr. et al. |
| 2024/0356960 A1 | 10/2024 | Griffin et al. |

FOREIGN PATENT DOCUMENTS

| | | |
|---|---|---|
| CN | 112291232 A | 1/2021 |
| CN | 116800548 A | 9/2023 |
| EP | 3220595 A1 | 9/2017 |
| WO | 2022125957 A2 | 6/2022 |
| WO | 2023021499 A1 | 2/2023 |
| WO | 2023064007 A1 | 4/2023 |

\* cited by examiner

SYSTEMS AND METHODS CONFIGURED FOR AUTOMATICALLY ASSIGNING A UNIQUE IDENTIFIER TO A DETECTED DEVICE

FIELD OF TECHNOLOGY

The present disclosure generally relates to automatically assigning a unique identifier to a detected device and methods of use thereof.

BACKGROUND OF TECHNOLOGY

Typically, network mapping is the study of the physical connectivity of networks, such as the internet. Network mapping discovers the devices on the network and their connectivity. Network mapping retrieves information about which devices and servers are connected to a specific network and the operating systems that they run. Network enumeration is the discovery of hosts or device on a network and can scan various ports on remote hosts to identify well known services in an attempt to further identify the function of a remote host.

SUMMARY OF DESCRIBED SUBJECT MATTER

In some embodiments, the present disclosure provides an exemplary technically improved computer-based method that includes at least the following steps: obtaining, by a processor, data associated with a device within a network; determining, by the processor, a digital fingerprint via identification data of the device based on a scan of the network and data associated with the device by: comparing the identification data of the device to a plurality of devices within the, generating a unique identification code that uniquely identifies the device based on a similarity score for the device, and determining the unique identification code for the device based on the digital fingerprint; and generating, by the processor, a network security map that represents a topology of the network, wherein the network security map maps the device within the topology according to the unique identification code so as to facilitate causing at least one security action with respect to the device within the network.

In some embodiments, the present disclosure provides a technically-improved computer-based system that includes a processor capable of instructing at least the following steps: obtain data associated with a device within a network; predict identification data for the device by utilizing a trained machine learning module to analyze historical data within the network and the data associated with the device; determine an identification data of the device based on a scan of the network and data associated with the device; compare the identification data of the device to a plurality of devices within the network to generate a unique identification code based on a similarity score for the device; validate the identification data of the device based on the similarity score meeting a predetermined threshold; assign the unique identification code to the device based on the validating of the identification data; and generate a network security map that represents a topology of the network, wherein the network security map maps the device within the topology according to the unique identification code so as to facilitate causing at least one security action with respect to the device within the network.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
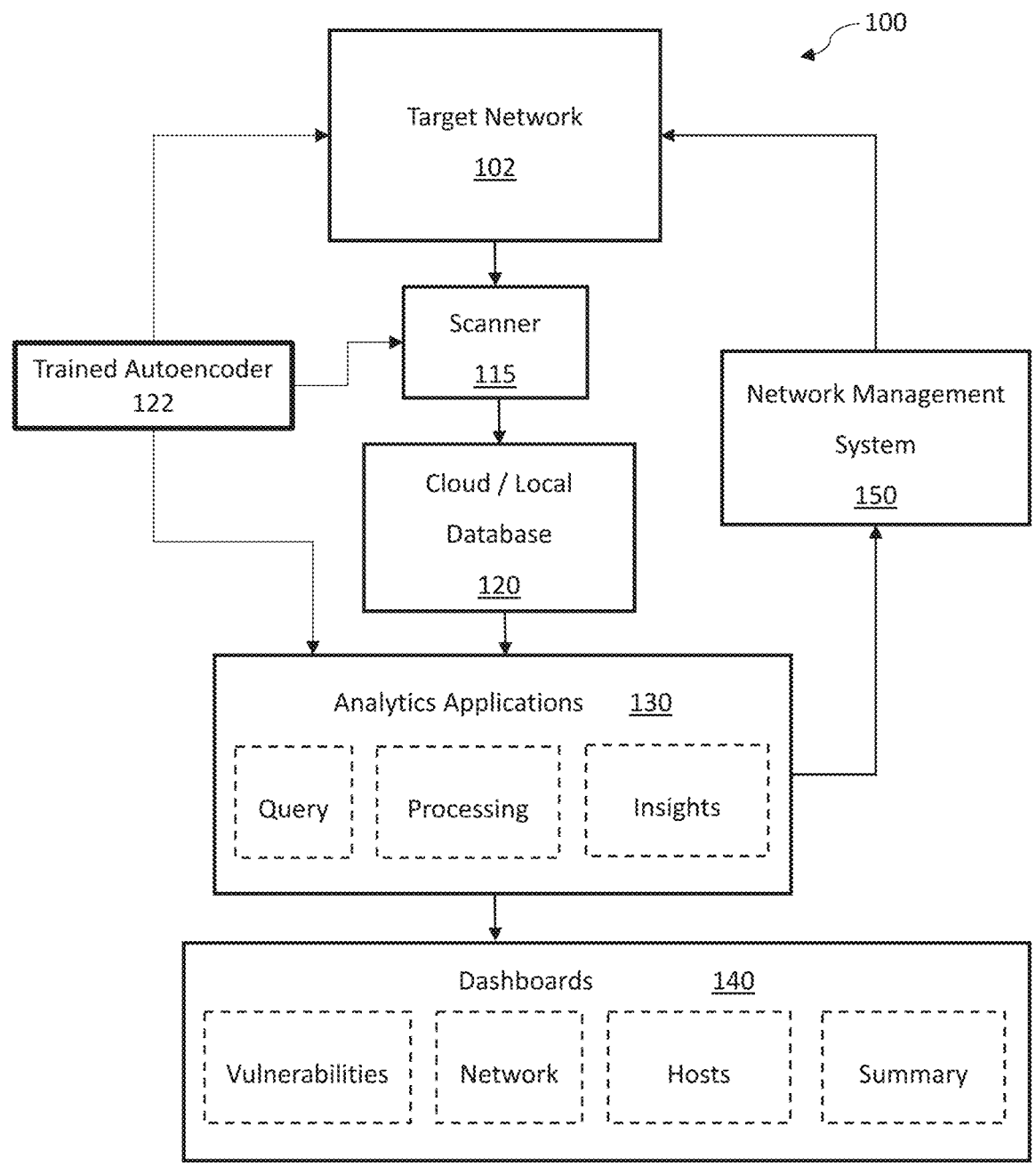
FIG. 1 depicts a block diagram of an exemplary computer-based system and platform for assigning digital fingerprints to a plurality of devices within a network to optimize securing a computer network, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

Each and every principle, methodology and/or system arrangement detailed herein may be utilized with one or more principles, methodology(ies) and/or system arrangement(s) detailed in one or more of: U.S. Pat. Nos. 10,454,597; 11,734,157; U.S. Patent Publication 2022/0342873; U.S. Patent Publication 2023/0004557; U.S. Patent Publication 2023/0077998; U.S. Patent Publication 2023/0013873; U.S. Patent Publication 2023/0306044, and Appendix A materials.

The present disclosure describes, in detail, systems and methods of utilizing a trained encoder to dynamically fingerprint a plurality of devices within a network of computers and automatically map a terrain of devices within the network based on each dynamic fingerprint. The following embodiments provide technical solutions and technical improvements over technical problems, drawbacks and/or deficiencies in the technical fields involving network security, digital fingerprinting, and network mapping. Specifically, a technological problem exists in merely relying on information for a host in a particular network to scan a configuration of the network at a particular time. Typically, a single configuration scan may provide information about devices on the network at the particular time of the scan, where the information may vary over time, especially when devices change physical and/or virtual location.

As explained in more detail below, technical solutions and technical improvements herein include aspects of improved technologies for utilizing an the trained encoder to dynamically assign a unique identification code of a first device; comparing a value of the first device associated with a plurality of features based on the unique identification code; assigning a second unique identification code of a second device when a comparison produces a match; and calculating a similarity score between the first unique identification code and the second unique identification code. The trained encoder may refer to a machine learning module capable of making comparisons across a plurality of fields that identify devices. In certain embodiments, the trained encoder may refer to a plurality of logic trees capable of comparing unique identification codes and a plurality of features associated with each unique identification code for a plurality of devices. For example, these fields of comparison associated for each device may include internet protocol addresses, host names, associated media access control (MAC) addresses, detected operating systems, and detected services. In some embodiments, the unique identification code may refer to a digital fingerprint associated with each device. In some embodiments, each device may refer to a host computing device capable of performing operations within the network. The trained encoder may also generate one or more vectors associated with each unique identification code for a particular device. In some embodiments, the terms host and device may be used in the present disclosure interchangeably. Each particular device may refer to a particular host device, such as a computing device, a server computing device, a workstation, a laptop, and/or a smartphone. In some embodiments, the trained encoder may store the unique identification codes in an identification code database. In certain embodiments, the identification code database may refer to a data repository. The trained encoder may scan the plurality of devices to obtain data related to a particular unique identification code associated with each device and the plurality of features associated with the particular unique identification code. In certain embodiments, the plurality of features may provide additional information on the particular device. The calculation of the similarity score may predict an optimal vector value for a particular device by identifying a component-wise average of the plurality of vectors across the plurality of devices, the vector associated with the particular device, and the vector with the highest frequency within the plurality of devices. In response to identifying each of these values, a removal of duplicate unique identification codes obtained within a single scan may be performed prior to calculating the similarity score, where the removal of the duplicate unique identification code may refer to a digital fingerprint for the particular device. In some embodiments, the similarity score between the plurality of devices may refer to a calculated cosine similarity between a vector value for the particular device and the vector values for the plurality of devices. In some embodiments, the trained encoder may store the second unique identification code in response to the calculated similarity score exceeding a predetermined threshold of criticality. In certain embodiments, the predetermined threshold of criticality may refer to a value set for similarity scores to determine matches between at least two devices of the plurality of devices.

In some embodiments, the present disclosure may optimize the comparison of each vector associated with the unique identification code and each vector within the data repository. In certain embodiments, the data repository may contain a plurality of vectors associated with the plurality of devices. In some embodiments, a plurality of features within each vector may be assigned a particular weight based on historical data and/or user input, where a weighted feature may modify the similarity score calculation. In some embodiments, one or more processors of a computing device may perform similar functions of a trained encoder, such as generating one or more data embeddings for each unique identification code based on the plurality of vectors and the plurality of features. In some embodiments, the trained encoder may be trained using historical unique identification codes for the plurality of devices and historical features associated with the historical unique identification codes. In certain embodiments, the trained encoder may generate one or more data embeddings associated with a large collection of devices within a given network. The data embeddings may refer to a collection of unique identification codes associated with the plurality of devices, where each particular unique identification code may be a digital fingerprint for a particular device. In some embodiments, the trained encoder may identify the plurality of features associated with the unique identification code associated with each device of the plurality of devices, generate the data embedding using a trained machine learning model and a generated vector for each feature, compute the similarity score between the data embedding associated with the particular device and the data embeddings associated with the plurality of devices, compare the calculated similarity score to the predetermined threshold of criticality to determine matches between data embeddings, and add the unique identification code of the particular device in response to a score that exceeds the threshold. For example, the trained encoder may automatically map the plurality of devices within the network at a given time and dynamically track movement by the plurality of devices within the network.

In some embodiments, the output of the trained encoder may be sent to a device interface that may generate a device summary report and a network summary report, where the device summary report may provide a host risk score, a number of vulnerabilities, a remediation rate, host IP information, and the network summary report may provide a network risk score, a number of at-risk hosts, a remediation rate, and a number of host within the network. In certain embodiments, the trained encoder may identify a particular device within the plurality of devices based on the unique identification code. In certain embodiments, the trained encoder may generate the network summary report by counting the plurality of unique identification codes.

FIG. 1 is a block diagram of a network system 100 for assigning digital fingerprints to a plurality of devices within a network to optimize securing a computer network in accordance with one or more embodiments of the present disclosure. The network system 100 may include a scanner 115, a cloud and/or local database 120, at least one analytics application(s) 130, at least one dashboard(s) 140 and a network management system 150 for securing a target network 102.

In some embodiments, the scanner 115 may run on the target network 102 from a scanner device to explore and gather information about devices of the target network 102. For example, the scanner 115 can scan the target network 102 and identifies media access control (MAC) addresses associated with all the devices connected therein. In some embodiments, the scanner 115 can identify active Internet protocol (IP) addresses within a given range or subnet and determine availability of one or more devices on the target network 102. Scans may include, but are not limited to, device discovery and vulnerability scans.

In some embodiments, the scan results may be pushed to database 120 for retrieval. The database 120 may be cloud-based or local to the scanner 115 or both. In some embodiments, the database 120 may refer to the data repository. By pushing the scan results to the database 120, the network system 100 can generate a plurality of unique identification codes for the plurality of devices, compare the plurality of unique identification codes, and calculate a similarity score based on the comparison of the plurality of unique identification codes. In certain embodiments, the network system 100 can assess and monitor network vulnerability, maintain an asset inventory, detect changes in the target network 102 and centralize reporting and analysis.

In some embodiments, the scanner 115 may transmit vulnerability assessment scan results to the database 120, where a user can maintain a historical record of security assessments and the historical data that includes historical unique identification codes for the plurality of devices and historical features. In certain embodiments, this historical data may be utilized to train an encoder 122. The trained encoder 122 may refer to a machine learning model and/or a plurality of logic trees capable of generating a plurality of unique identification codes for the plurality of devices, comparing the plurality of unique identification codes, and calculating a similarity score based on the comparison of the plurality of unique identification codes. In some embodiments, the trained encoder 122 may track changes over time, compare results, and ensure compliance with security policies.

In some embodiments, the trained encoder 122 may generate the plurality of unique identification codes for the plurality of devices identified by the scanner 115 within the target network 102. In some embodiments, the output of the scanner 115 (e.g., network scans) may reveal information about the plurality of devices running on the target network 102, where the network scans may provide information related to each device and any software being performed by each device. In some embodiments, the network system 100 may generate an inventory of network assets in response to transmitting the output of the scanner 115 to the database 120.

In some embodiments, the network system 100 may perform a plurality of network scans for the plurality of devices to detect changes in the network environment. In some embodiments, the trained encoder 122 may dynamically track modifications within the plurality of devices by storing scan results in the database 120. In certain embodiments, the modifications that can be tracked may include new devices added; software installations or updates; and configuration changes. In other embodiments, the new devices may be identified by a unique identification code not found within the database 120. In some embodiments, the plurality of network scans may generate the plurality of vectors associated with each unique identification code and the plurality of features associated with each unique identification code.

In some embodiments, the network system 100 may calculate a similarity score for one or more devices within the plurality of devices based on the plurality of unique identification codes, specifically the plurality of vectors and the plurality of features in comparison to a predetermined threshold of criticality. In certain embodiments, the database 120 may provide a centralized repository for scan results to optimize centralized reporting and analysis. In some embodiments, the trained encoder 122, in communication with the database 120, may generate reports, visualize trends, and analyze patterns within the target network 102. For example, the trained encoder 122 may generate a plurality of notifications that can be displayed via a user interface, where the plurality of notifications may facilitate decision-making, risk assessment, and resource allocation for the plurality of devices within the target network 102.

In some embodiments, the at least one analytics application(s) 130 may query the database 120 to retrieve scan results, analyze scan results, and generate a plurality of unique identification codes to provide digital fingerprints to one or more devices within the plurality of devices and displayed via a user interface to end users. In some embodiments, the at least one analytics application(s) 130 may involve the process of collecting and analyzing network data to improve various aspects of the target network 102. The present disclosure describes a system and method to automate assigning digital fingerprints to each device within the plurality of devices.

In some embodiments, the at least one analytics application(s) 130 may extract data collected from the plurality of devices, where the plurality of devices may include: network devices (such as switches, routers, and wireless access points), servers (including syslog, DHCP, AAA, and configuration databases), and traffic-flow details (such as wireless congestion, data speeds, and latency). In certain embodiments, the at least one analytics application(s) 130 may provide insights of the target network 102 to identify host risk scores, any vulnerabilities of each device, a remediation rate and device IP information for each device of the plurality of devices. In certain embodiments, the at least one analytics application(s) 130 may provide insights of the target network 102 to identify a network risk score, a number of at-risk devices within the plurality of devices, a remediation rate, and the number of devices within the plurality of devices. In certain embodiments, the at least one analytics application(s) 130 may evaluate the health of network devices, recommend adjustments to enhance performance, analyze traffic to and from endpoints to build profiles, and detect anomalies that may indicate compromised endpoints.

As shown in FIG. 1, the insights generated by the at least one analytics application(s) 130 may be provided to both the at least one dashboard(s) 140 and the network management system 150. In some embodiments, the at least one dashboard(s) 140 may display vulnerabilities of the target network 102, network data, particular device data, a device summary and a network summary.

In some embodiments, the network management system 150 may be an application or set of applications that enables network administrators to manage various components within the target network. It provides a unified platform for configuring, monitoring and optimizing network performance. In some embodiments, the network management system 150 allows administrators to set up and adjust network devices (such as switches, routers, and access points) according to specific requirements. In some embodiments, the network management system 150 may collect real-time data from network elements and endpoint devices (e.g., mobile phones, laptops). This data helps proactively identify performance issues, monitor security, and segment the network. The network management system 150 accelerates problem resolution by providing insights into network health and performance. The network management system 150 assists in monitoring security events, detecting anomalies, and ensuring compliance with security policies.

Figure 2:
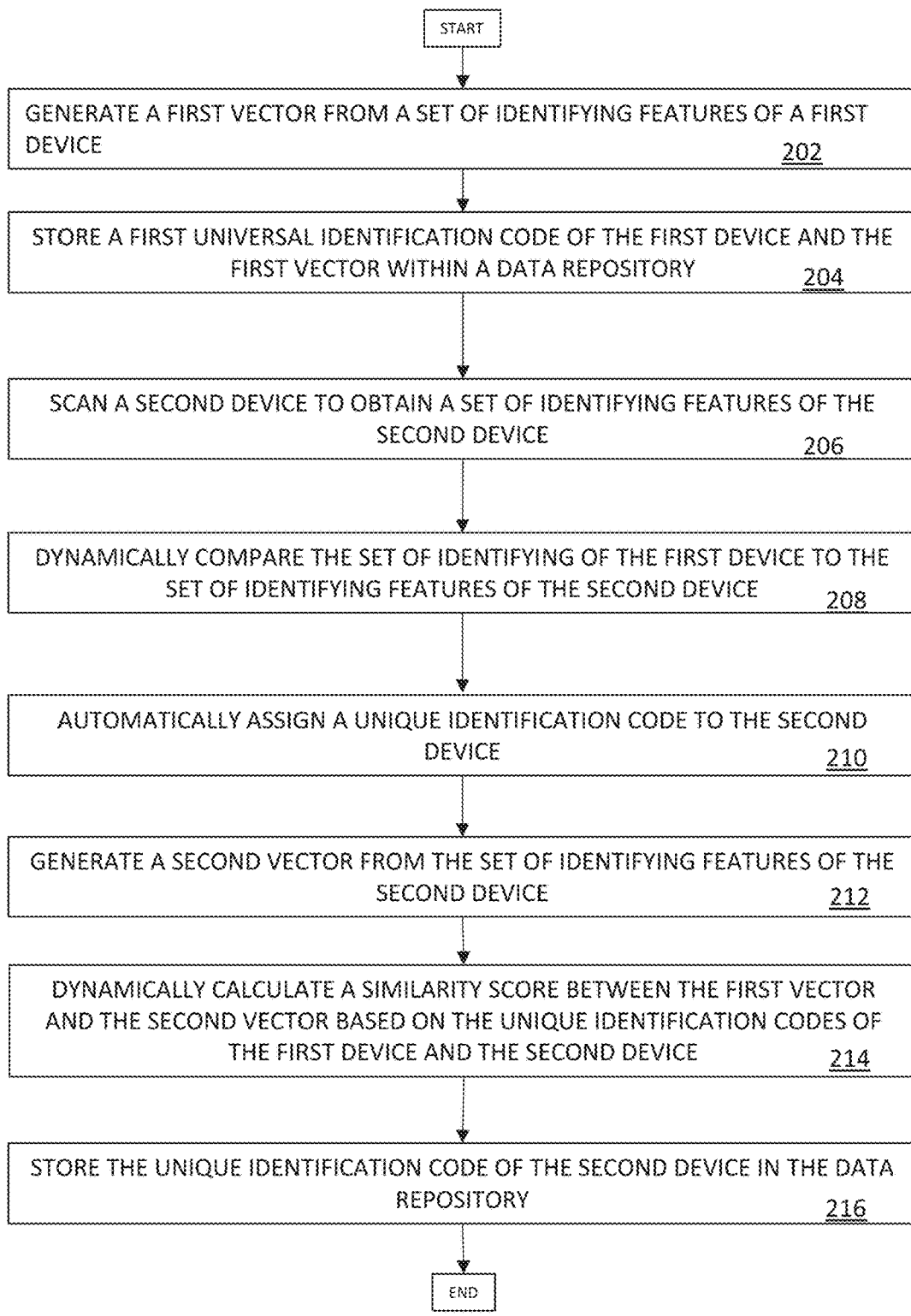
FIG. 2 is a flowchart illustrating operational steps for assigning a digital fingerprint to one or more devices of the plurality of devices based on a calculated similarity score between the plurality of unique identification codes, in accordance with one or more embodiments of the present disclosure.

FIG. 2 is a flowchart 200 depicting operational steps for assigning a digital fingerprint to one or more devices of the plurality of devices based on a calculated similarity score between the plurality of unique identification codes. In some embodiments, at least one processor of a computing device may perform the following steps, where the steps respectively correlate with 202-216 of FIG. 2.

In step 202, the at least one processor may generate a first vector from a set of identifying features of a first device. In step 204, the at least one processor may store a first universal identification code of the first device and the first vector within the data repository 120. In step 206, the at least one processor may scan a second device to obtain a set of identifying features of the second device. In step 208, the at least one processor may dynamically compare the set of identifying features of the first device to the set of identifying features of the second device. In step 210, the at least one processor may automatically assign a unique identification code to the second device, where the unique identification code is different from the unique identification code to the first device. In step 212, the at least one processor may generate a second vector from the set of identifying features of the second device. In step 214, the at least one processor may dynamically calculate a similarity score between the first vector and the second vector based on the unique identification codes of the first device and the second device. In step 216, the at least one processor may store the unique identification code of the second device to the data repository 120 in response to the similarity score being above a predetermined threshold.

In some embodiments, the unique identification code may refer to a digital fingerprint to efficiently identify each device of the plurality of devices within the target network 102. In some embodiments, the set of identifying features for each device may include the device IP address, a host name, one or more MAC address(es), a detected operating system, and one or more detected service(s). In some embodiments, the calculated similarity score may aggregate the vector of each device and a value associated with the set of identifying features for each device of the plurality of devices. In some embodiments, the trained encoder 122 may perform the steps 202-216 of FIG. 2.

Figure 3:
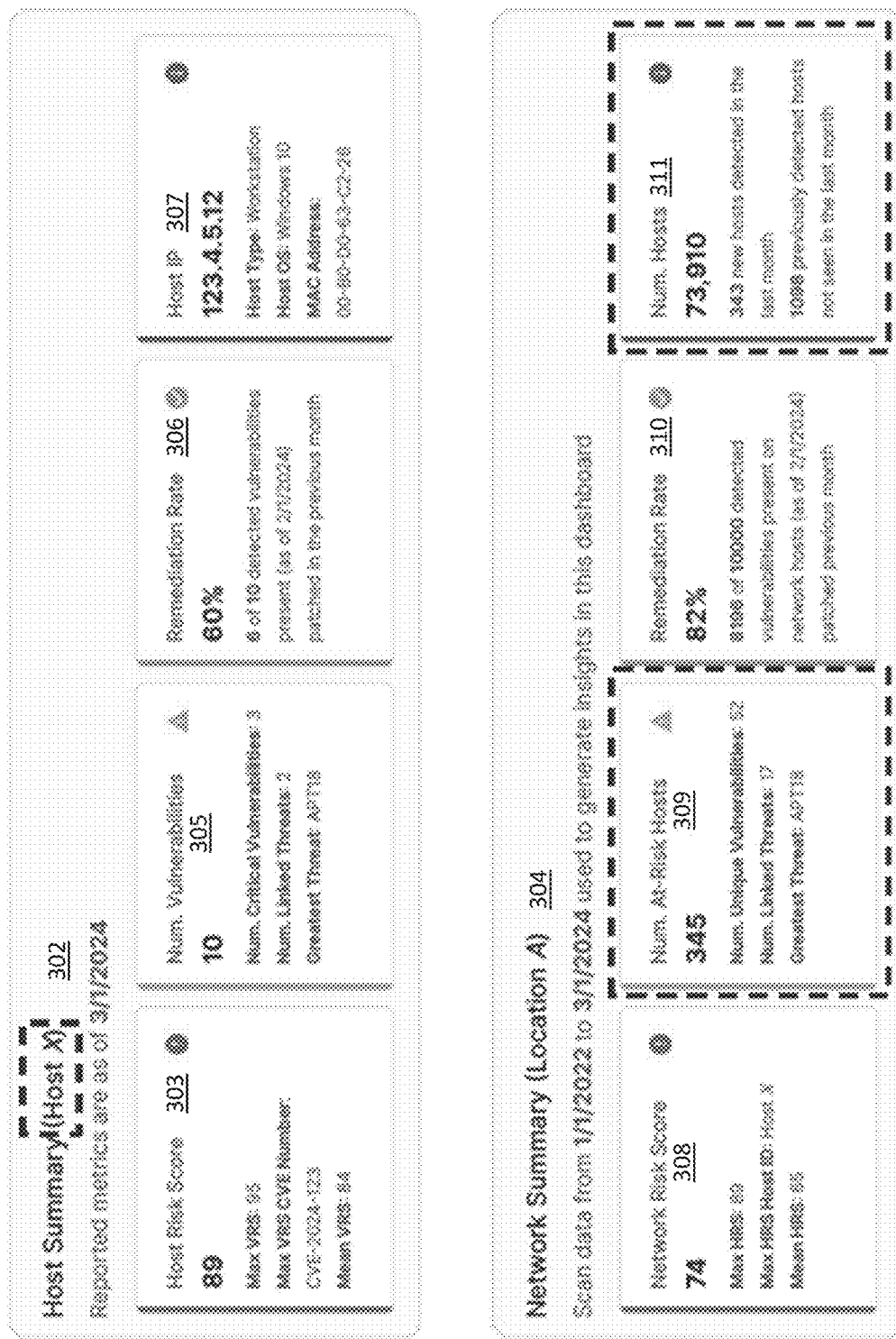
FIG. 3 depicts an example output using the trained encoder and the at least one analytics application(s) based on the scans of the plurality of devices within the target network, in accordance with one or more embodiments of the present disclosure.

FIG. 3 depicts an example output 300 using the trained encoder 122 and the at least one analytics application(s) 130 based on the scans of the plurality of devices within the target network 102, specifically the comparison of the plurality of vectors and the set of identifying features for each device based on the unique identification codes for each device of the plurality of devices. The output of the trained encoder 122 may be utilized by the analytics application 130 to display, via a user interface and/or the analytics application(s) 130, a device summary report 302 and a network summary report 304. In the device summary report 302, a host risk score 303, a number of vulnerabilities 305, a remediation rate 306, and a device IP information 307 may be displayed via the user interface. In the network summary report 304, a network risk score 308, a number of at-risk hosts 309, a remediation rate 310, and a number of hosts 311 within the plurality of devices may be displayed via the user interface.

Figure 4:
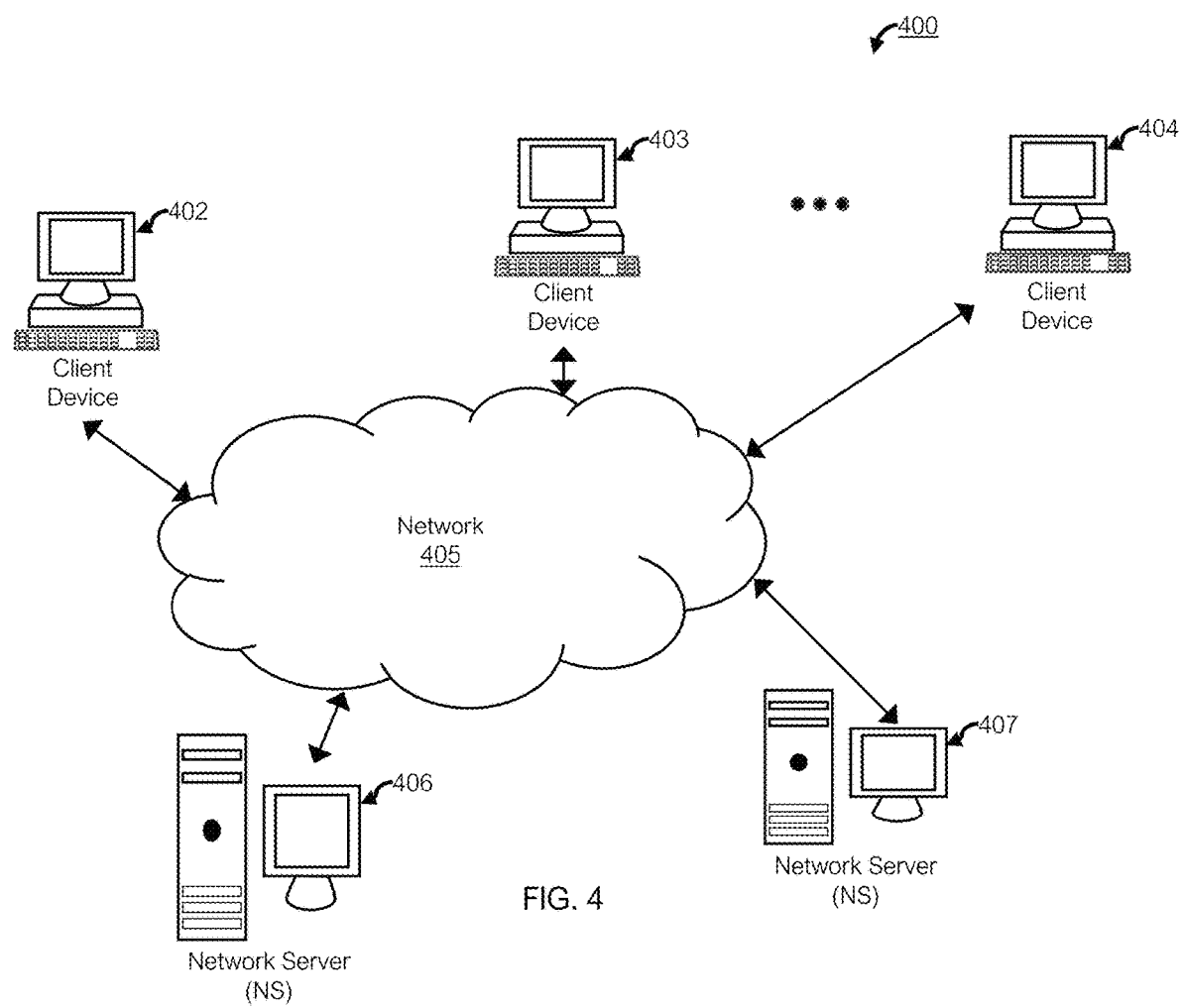
FIG. 4 depicts a block diagram of an exemplary computer-based system/platform in accordance with one or more embodiments of the present disclosure.

FIG. 4 depicts a block diagram of an exemplary computer-based system and platform 400 for the data optimization module in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to generate a plurality of unique identification codes for the plurality of devices, compare the plurality of unique identification codes, and calculate a similarity score based on the comparison of the plurality of unique identification codes, as detailed herein. In some embodiments, the exemplary computer-based system and platform 400 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 4, client device 402, client device 303 through client device 304 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the client devices 402 through 404 may be personal computers, multiprocessor systems, microprocessor-based or programmable consumer electronics, network PCs, and the like. In some embodiments, one or more client devices within client devices 402 through 404 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more client devices within client devices 402 through 404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 402 through 404 may run one or more applications, such as Internet browsers, mobile applications, voice calls, video games, videoconferencing, and email, among others. In some embodiments, one or more client devices within client devices 402 through 404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 402 through 404 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 402 through 404 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Apache on Linux or Microsoft IIS (Internet Information Services). In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 401 through 404.

In some embodiments and, optionally, in combination of any embodiment described above or below, for example, one or more exemplary computing client devices 402 through 404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 5:
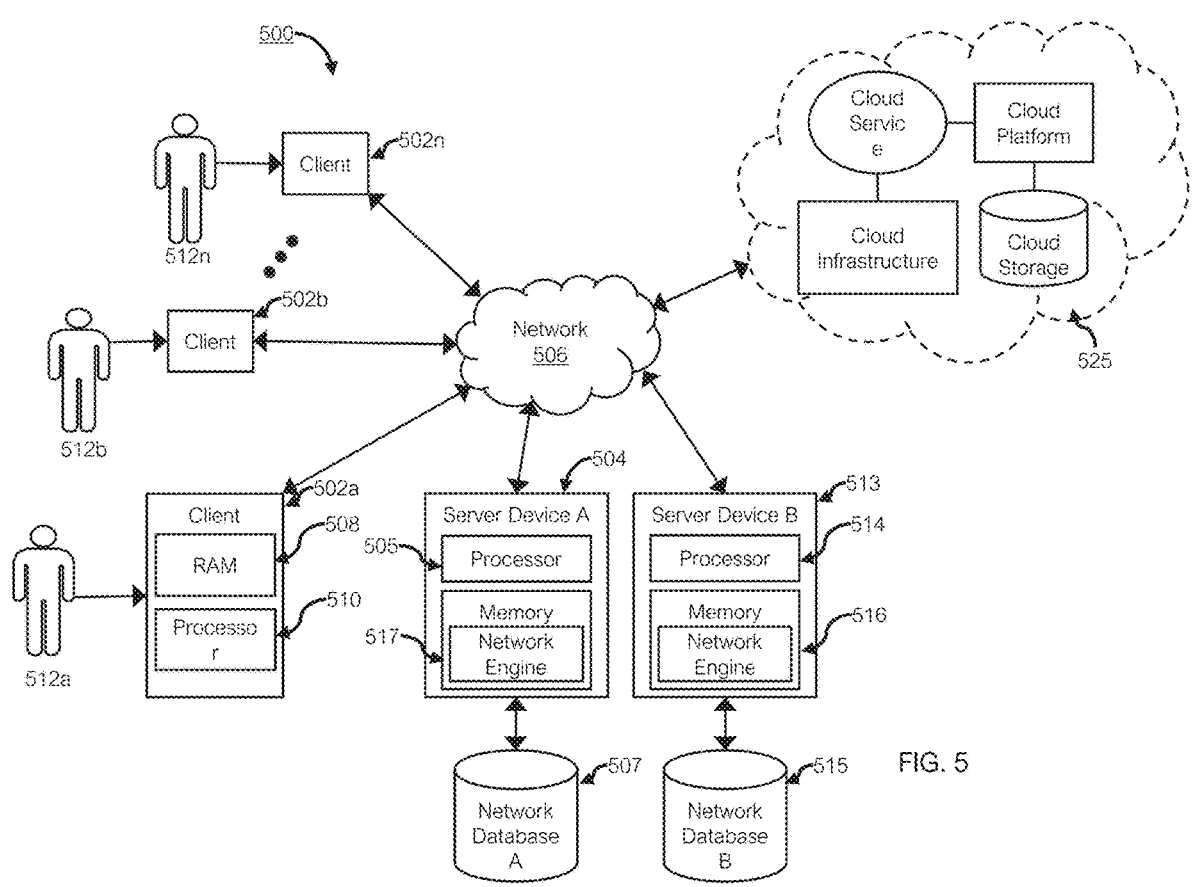
FIG. 5 depicts a block diagram of another exemplary computer-based system/platform in accordance with one or more embodiments of the present disclosure.

FIG. 5 depicts a block diagram of another exemplary computer-based system and platform 500 for the trained autoencoder 122 in accordance with one or more embodiments of the present disclosure. However, not all these components may be required to practice one or more embodiments, and variations in the arrangement and type of the components may be made without departing from the spirit or scope of various embodiments of the present disclosure. In some embodiments, the client device 502*a*, client device 502*b* through client device 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client device 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 502*a* through 502*n* may also comprise a number of external or internal devices such as a mouse, a CD-ROM, DVD, a physical or virtual keyboard, a display, or other input or output devices. In some embodiments, examples of client devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, client devices 502*a* through 502*n* may be specifically programmed with one or more application programs in accordance with one or more principles/methodologies detailed herein. In some embodiments, client devices 502*a* through 502*n* may operate on any operating system capable of supporting a browser or browser-enabled application, such as Microsoft™, Windows™, and/or Linux. In some embodiments, client devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, user 512*a*, user 512*b* through user 512*n*, may communicate over the exemplary network 506 with each other and/or with other systems and/or devices coupled to the network 506. As shown in FIG. 5, exemplary server devices 504 and 513 may include processor 505 and processor 514, respectively, as well as memory 517 and memory 516, respectively. In some embodiments, the server devices 504 and 513 may be also coupled to the network 506. In some embodiments, one or more client devices 502*a* through 502*n* may be mobile clients.

In some embodiments, at least one database of exemplary databases 507 and 515 may be any type of database, including a database managed by a database management system (DBMS). In some embodiments, an exemplary trained autoencoder 122 may be specifically programmed as an engine that controls organization, storage, management, and/or retrieval of data in the respective database. In some embodiments, the exemplary trained autoencoder 122 may be specifically programmed to provide the ability to generate a plurality of unique identification codes for the plurality of devices, compare the plurality of unique identification codes, and calculate a similarity score based on the comparison of the plurality of unique identification codes. In some embodiments, the exemplary trained autoencoder may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
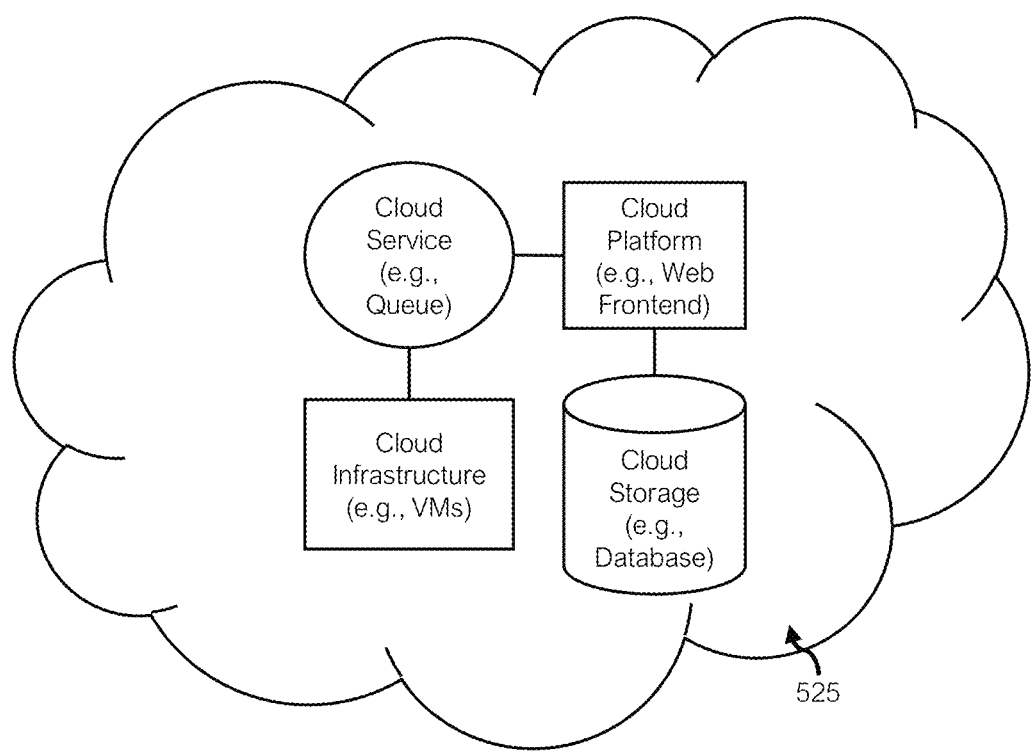
FIGS. 6 and 7 are diagrams illustrating implementations of cloud computing architecture/aspects with respect to which the disclosed technology may be specifically configured to operate, in accordance with one or more embodiments of the present disclosure.
Figure 7:
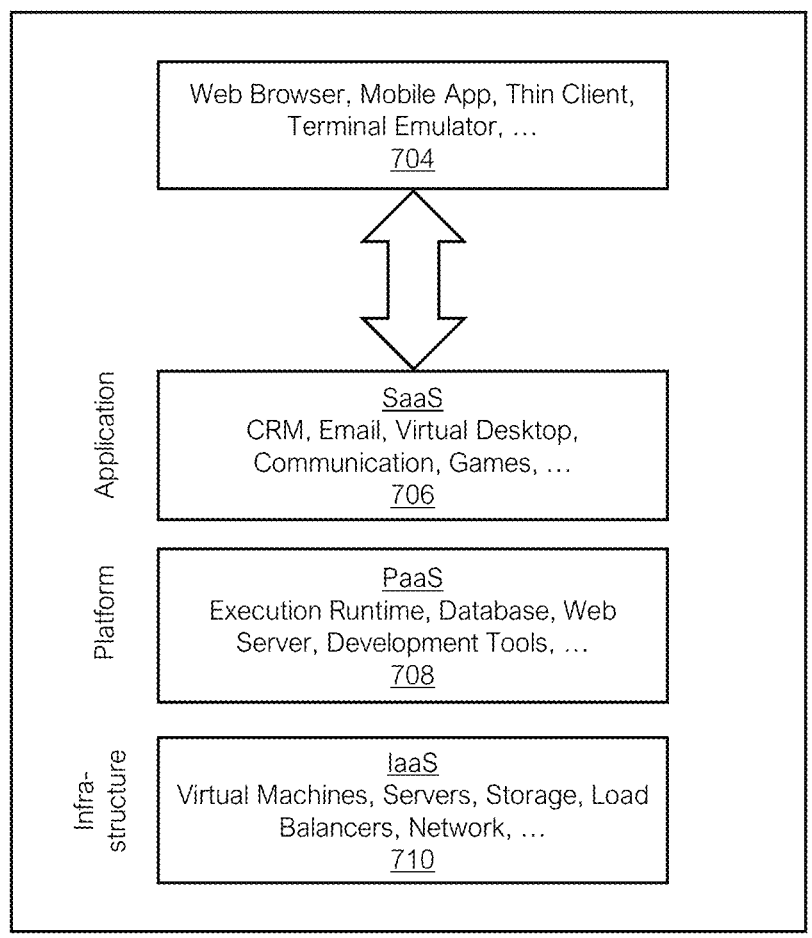

In some embodiments, the exemplary trained autoencoder of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator, or other endpoint 704. FIGS. 6 and 7 illustrate schematics of exemplary implementations of the cloud computing/architecture(s) in which the trained autoencoder 122 of the present disclosure may be specifically configured to operate.

Figure 8:
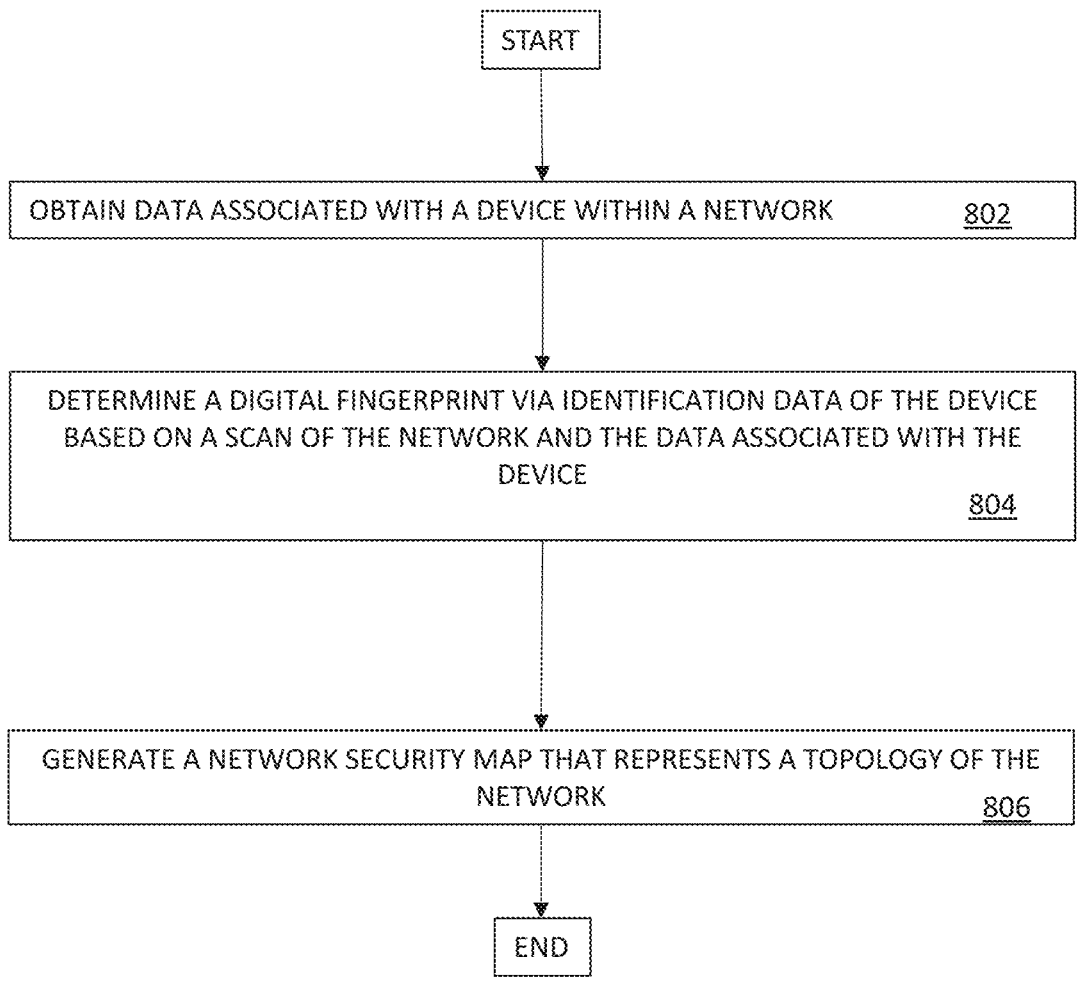
FIG. 8 is a flowchart depicting operational steps for generating a network security map that represents a topology of the network, in accordance with one or more embodiments of the present disclosure.

FIG. 8 is a flowchart 800 depicting operational steps for generating a network security map that represents a topology of the network, in accordance with one or more embodiments of the present disclosure. In some embodiments, at least one processor of a computing device may perform the following steps, where the steps respectively correlate with 802-808 of FIG. 8. In step 802, the at least one processor may obtain data associated with a device within a network. In step 804, the at least one processor may determine digital fingerprint via identification data of the device based on a scan of the network and the data associated with the device by comparing the identification data of the device to a plurality of devices within the network; generating the unique identification code that uniquely identifies the device based on a similarity score for the device; and determining the unique identification code to the device based on the digital fingerprint. In step 806, the at least one processor may generate a network security map that represents the topology of the network, where the network security map maps the device within the topology according to the unique identification code so as to facilitate causing at least one security action with respect to the device within the network.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

At least some aspects of the present disclosure will now be described with reference to the following numbered clauses.

Clause 1. A computer-implemented method may include: obtaining, by a processor, data associated with a device within a network; determining, by the processor, a digital fingerprint via identification data of the device based on a scan of the network and data associated with the device by: comparing the identification data of the device to a plurality of devices within the, generating a unique identification code that uniquely identifies the device based on a similarity score for the device, and determining the unique identification code for the device based on the digital fingerprint; and generating, by the processor, a network security map that represents a topology of the network, wherein the network security map maps the device within the topology according to the unique identification code so as to facilitate causing at least one security action with respect to the device within the network.

Clause 2. The method according to clause 1, where the device is a host device capable of performing operations within the network.

Clause 3. The method according to clause 1 or 2, where the network includes a target network within a plurality of networks.

Clause 4. The method according to clause 1, 2 or 3, further including storing the identification of the device in a data repository.

Clause 5. The method according to clause 1, 2, 3 or 4, where the scan of the network includes an vulnerability analysis of the device and the plurality of devices within the network.

Clause 6. The method according to clause 1, 2, 3, 4 or 5, where the unique identification code is a digital fingerprint associated with the device.

Clause 7. The method according to clause 1, 2, 3, 4, 5 or 6, where the similarity score includes calculating a similarity score for the device based on an output of the scan of the device, where the output of the scan includes a value assigned to a plurality of features associated with the identification data of the device.

Clause 8. The method according to clause 1, 2, 3, 4, 5, 6 or 7, further including predicting identification data for the device by utilizing a trained machine learning module to analyze historical data within the network and the data associated with the device.

Clause 9. The method according to clause 1, 2, 3, 4, 5, 6, 7, or 8, where the trained machine learning module includes a trained encoder capable of: identifying a component-wise average of a plurality of features associated with the identification data for the device; and removing a duplicate unique identification code obtained within the scan.

Clause 10. The method according to clause 1, 2, 3, 4, 5, 6, 7, 8 or 9, further including calculating a criticality score of the device based on the identification data within the network.

Clause 11. The method according to clause 1, 2, 3, 4, 5, 6, 7, 8, 9 or 10, where the criticality score of the device is representative of a degree of importance to security of the network.

Clause 12. The method according to clause 1, 2, 3, 4, 5, 6, 7, 8, 9, 10 or 11, where the identification data includes a device category, wherein the device category is one of workstation, router, server, printer, camera, or a combination thereof.

Clause 13. The method according to clause 1, 2, 3, 4, 5, 6, 7, 8, 9, 10, 11 or 12, further including conducting the scan of the network and generating the similarity score are conducted repeatedly at a predetermined frequency.

Clause 14. The method according to clause 1, 2, 3, 4, 5, 6, 7, 8, 9, 10, 11, 12 or 13, further including calculating a device risk score for the device in the network based on a historical data associated within the network, a number of vulnerabilities within the network, and a criticality score of the device.

Clause 15. A computer-implemented method may include: obtaining, by a processor, data associated with a device within a network; predicting, by the processor, identification data for the device by utilizing a trained machine learning module to analyze historical data within the network and the data associated with the device; determining, by the processor, an identification data of the device based on a scan of the network and data associated with the device; comparing, by the processor, the identification data of the device to a plurality of devices within the network to generate a unique identification code based on a similarity score for the device; validating, by the processor, the identification data of the device based on the similarity score meeting a predetermined threshold; assigning, by the processor, the unique identification code to the device based on the validating of the identification data; and generating, by the processor, a network security map that represents a topology of the network, wherein the network security map maps the device within the topology according to the unique identification code so as to facilitate causing at least one security action with respect to the device within the network.

Clause 16. The method according to clause 15, where the device is a host device capable of performing operations within the network.

Clause 17. The method according to clause 15 or 16, where further including storing the identification of the device in a data repository.

Clause 18. The method according to clause 15, 16, or 17, where the scan of the network includes a vulnerability analysis of the device and the plurality of devices within the network.

Clause 19. The method according to clause 15, 16, 17, or 18, where the unique identification code is a digital fingerprint associated with the device.

Clause 20. The method according to clause 15, 16, 17, 18, or 19, where the similarity score includes calculating a similarity score for the device based on an output of the scan of the device, where the output of the scan includes a value assigned to a plurality of features associated with the information data of the device.

Clause 21. The method according to clause 15, 16, 17, 18, 19, or 20, where the trained machine learning module includes a trained encoder capable of: identifying a component-wise average of a plurality of features associated with the identification data for the device; and removing a duplicate unique identification code obtained within the scan.

Clause 22. The method according to clause 15, 16, 17, 18, 19, 20, or 21, further including a criticality score of the device based on the identification data within the network.

Clause 23. The method according to clause 15, 16, 17, 18, 19, 20, 21, or 22, where the criticality score of the device is representative of a degree of importance to security of the network.

Clause 24. The method according to clause 15, 16, 17, 18, 19, 20, 21, 22, or 23, further including conducting the scan of the network and generating the similarity score are conducted repeatedly at a predetermined frequency.

Clause 25. The method according to clause 15, 16, 17, 18, 19, 20, 21, 22, 23, or 24, further including calculating a device risk score for the device in the network based on a historical data associated within the network, a number of vulnerabilities within the network, and a criticality score of the device.

Clause 26. A system includes: a non-transient computer memory, storing software instructions; at least one processor of a computing device associated with a user; where, when the processor executes the software instructions, the computing device is programmed to: obtain data associated with a device within a network; predict identification data for the device by utilizing a trained machine learning module to analyze historical data within the network and the data associated with the device; determine an identification data of the device based on a scan of the network and data associated with the device; compare the identification data of the device to a plurality of devices within the network to generate a unique identification code based on a similarity score for the device; validate the identification data of the device based on the similarity score meeting a predetermined threshold; assign the unique identification code to the device based on the validating of the identification data; and generate a network security map that represents a topology of the network, wherein the network security map maps the device within the topology according to the unique identification code so as to facilitate causing at least one security action with respect to the device within the network.

Clause 27. The system according to clause 26, where the unique identification code is a digital fingerprint associated with the device.

Clause 28. The system according to clause 26 or 27, where the similarity score includes calculating a similarity score for the device based on an output of the scan of the device, where the output of the scan includes a value assigned to a plurality of features associated with the identification data of the device.

Clause 29. The system according to clause 26, 27, or 28, where the trained machine learning module includes a trained encoder capable of: identifying a component-wise average of a plurality of features associated with the identification data for the device; and removing a duplicate unique identification code obtained within the scan.

Clause 30. A system includes: a non-transient computer memory, storing software instructions; at least one processor of a computing device associated with a user; where, when the processor executes the software instructions, the computing device is programmed to: obtain data associated with a device within a network; determine a digital fingerprint via identification data of the device based on a scan of the network and the data associated with the device by: comparing the identification data of the device to a plurality of devices within the network, generating a unique identification code that uniquely identifies the device based on a similarity score for the device, and determining, the unique identification code to the device based on the digital fingerprint; and generate a network security map that represents a topology of the network, wherein the network security map maps the device within the topology according to the unique identification code so as to facilitate causing at least one security action with respect to the device within the network.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
obtaining, by a processor, a network map of a plurality of devices based on a scan of a network at a particular period of time data;
determining, by the processor, a digital fingerprint via a candidate identification data of at least one device of the plurality of devices within the network map by:
comparing the candidate identification data of the at least one device to other identification data associated with at least one previously identified device to verify the candidate identification data at the particular period of time to form verified identification data, and
generating a unique identification code that uniquely identifies the at least one device based on a similarity score and the verified identification data of the at least one device to form a digital fingerprint of the at least one device; and
generating, by the processor, a network security map that maps the at least one device based on the digital fingerprint of the at least one device so as to facilitate causing at least one security action with respect to the at least one device within the network, wherein the at least one security action is correlated to the similarity score of the at least one device within the network security map.

2. The method of claim 1, wherein the device is a host device capable of performing operations within the network.

3. The method of claim 1, wherein the network comprises a target network within a plurality of networks.

4. The method of claim 1, further comprising storing the identification of the device in a data repository.

5. The method of claim 1, wherein the scan of the network comprises a vulnerability analysis of the device and the plurality of devices within the network.

6. The method of claim 1, wherein the unique identification code is a digital fingerprint associated with the device.

7. The method of claim 1, wherein the similarity score comprises calculating a similarity score for the device based on an output of the scan of the device, wherein the output of the scan comprises a value assigned to a plurality of features associated with the identification data of the device.

8. The method of claim 1, further comprising predicting identification data for the device by utilizing a trained machine learning module to analyze historical data within the network and the data associated with the device.

9. The method of claim 1, wherein the trained machine learning module comprises a trained encoder capable of:
identifying a component-wise average of a plurality of features associated with the identification data for the device; and
removing a duplicate unique identification code obtained within the scan.

10. The method of claim 1, further comprising a criticality score of the device based on the identification data within the network.

11. The method of claim 10, wherein the criticality score of the device is representative of a degree of importance to security of the network.

12. The method of claim 1, wherein the identification data comprises a device category, wherein the device category is one of workstation, router, server, printer, camera, or a combination thereof.

13. The method of claim 1, further comprising conducting the scan of the network and generating the similarity score are conducted repeatedly at a predetermined frequency.

14. The method of claim 1, further comprising calculating a device risk score for the device in the network based on a historical data associated within the network, a number of vulnerabilities within the network, and a criticality score of the device.

15. A computer-implemented method comprising:
obtaining, by a processor, a network map of a plurality of devices based on a scan of a network at a particular period of time;
predicting, by the processor, a candidate identification data for at least one device of the plurality of devices by utilizing a trained machine learning module to analyze historical data within the network;
determining, by the processor, a digital fingerprint via the candidate identification data of the at least one device of the plurality of devices within the network map by:
comparing, by the processor, the candidate identification data of the at least one device to other identification data associated with at least one previously identified device to generate a unique identification code based on a similarity score for the at least one device,
validating, by the processor, the candidate identification data of the at least one device based on the similarity score meeting a predetermined threshold to form verified identification data,
assigning, by the processor, the unique identification code to the at least one device based on the the verified identification data; and
generating, by the processor, a network security map that maps the at least one device based on the digital fingerprint of the at least one device so as to facilitate causing at least one security action with respect to the at least one device within the network.

16. The method of claim 15, wherein the device is a host device capable of performing operations within the network.

17. The method of claim 15, further comprising storing the identification of the device in a data repository.

18. The method of claim 15, wherein the scan of the network comprises a vulnerability analysis of the device and the plurality of devices within the network.

19. The method of claim 15, wherein the unique identification code is a digital fingerprint associated with the device.

20. The method of claim 15, wherein the similarity score comprises calculating a similarity score for the device based on an output of the scan of the device, wherein the output of the scan comprises a value assigned to a plurality of features associated with the identification data of the device.

21. The method of claim 15, wherein the trained machine learning module comprises a trained encoder capable of:
identifying a component-wise average of a plurality of features associated with the identification data for the device; and
removing a duplicate unique identification code obtained within the scan.

22. The method of claim 15, further comprising a criticality score of the device based on the identification data within the network.

23. The method of claim 22, wherein the criticality score of the device is representative of a degree of importance to security of the network.

24. The method of claim 15, further comprising conducting the scan of the network and generating the similarity score are conducted repeatedly at a predetermined frequency.

25. The method of claim 15, further comprising calculating a device risk score for the device in the network based on a historical data associated within the network, a number of vulnerabilities within the network, and a criticality score of the device.

26. A system comprises:
  a non-transient computer memory, storing software instructions;
  at least one processor of a computing device associated with a user;
    wherein, when the processor executes the software instructions, the computing device is programmed to:
    obtain a network map of a plurality of devices based on a scan of a network at a particular period of time;
    predict identification data for at least one device by utilizing a trained machine learning module to analyze historical data within the network;
    determine a digital fingerprint via a candidate identification data of the at least one device of the plurality of devices within the network map;
    compare the candidate identification data of the at least one device to other identification data associated with at least one previously identified device to generate a unique identification code based on a similarity score for the at least one device,
    validate the candidate identification data of the at least one device based on the similarity score meeting a predetermined threshold to form verified identification data;
    assign the unique identification code to the at least one device based on the verified identification data; and
    generate a network security map that maps the at least one device based on the digital fingerprint of the at least one device so as to facilitate causing at least one security action with respect to the at least one device within the network, wherein the at least one security action is correlated to the similarity score of the at least one device within the network security map.

27. The system of claim 26, wherein the unique identification code is a digital fingerprint associated with the device.

28. The system of claim 26, wherein the similarity score comprises calculating a similarity score for the device based on an output of the scan of the device, wherein the output of the scan comprises a value assigned to a plurality of features associated with the identification data of the device.

29. The system of claim 26, wherein the trained machine learning module comprises a trained encoder capable of:
  identifying a component-wise average of a plurality of features associated with the identification data for the device; and
  removing a duplicate unique identification code obtained within the scan.

30. A system comprises:
  a non-transient computer memory, storing software instructions;
  at least one processor of a computing device associated with a user;
    wherein, when the processor executes the software instructions, the computing device is programmed to:
    obtain a network map of a plurality of devices based on a scan of a network at a particular period of time;
    determine a digital fingerprint via a candidate identification data of at least one device of the plurality of devices within the network map by:
      comparing the candidate identification data of the at least one device to other identification data associated with at least one previously identified device to verify the candidate identification data at the particular period of time to form verified identification data, and
      generating a unique identification code that uniquely identifies the at least one device based on a similarity score and the verified identification data of the at least one device to form a digital fingerprint of the at least one device, and
    generate a network security map that maps the at least one device based on the digital fingerprint of the at least one device so as to facilitate causing at least one security action with respect to the device within the network, wherein the at least one security action is correlated to the similarity score of the at least one device within the network security map.

* * * * *